United States Patent
Hsu et al.

(10) Patent No.: US 7,339,958 B2
(45) Date of Patent: Mar. 4, 2008

(54) SYSTEM AND METHOD FOR PERFORMING SIGNAL SYNCHRONIZATION OF DATA STREAMS

(75) Inventors: Chien-Hua Hsu, Hsinchu (TW); Huang-Jen Chen, Tainan (TW)

(73) Assignee: Mediatek, Inc., Hsin-Chu (TW)

( * ) Notice: Subject to any disclaimer, the term of this patent is extended or adjusted under 35 U.S.C. 154(b) by 627 days.

(21) Appl. No.: 11/028,117

(22) Filed: Jan. 3, 2005

(65) Prior Publication Data

US 2006/0146886 A1    Jul. 6, 2006

(51) Int. Cl.
*H04J 3/06* (2006.01)
(52) U.S. Cl. ............ 370/509; 370/516; 375/240.28
(58) Field of Classification Search ............ None
See application file for complete search history.

(56) References Cited

U.S. PATENT DOCUMENTS

| | | | | |
|---|---|---|---|---|
| 5,740,204 A | * | 4/1998 | Nagashima | 375/341 |
| 5,796,444 A | * | 8/1998 | Inamori | 348/525 |
| 5,963,673 A | * | 10/1999 | Kodama et al. | 382/239 |
| 6,035,092 A | * | 3/2000 | Fujinami | 386/47 |
| 6,307,594 B1 | * | 10/2001 | Yamauchi | 348/512 |
| 6,522,665 B1 | * | 2/2003 | Suzuki et al. | 370/471 |
| 6,680,753 B2 | * | 1/2004 | Kahn | 348/512 |
| 6,826,245 B1 | | 11/2004 | Brown et al. | |
| 6,925,250 B1 | * | 8/2005 | Oshima et al. | 386/111 |
| 6,993,251 B1 | * | 1/2006 | Phillips et al. | 386/125 |
| 2001/0026630 A1 | * | 10/2001 | Honda | 382/107 |
| 2002/0048330 A1 | | 4/2002 | Schetelig et al. | |
| 2004/0264577 A1 | * | 12/2004 | Jung | 375/240.24 |
| 2007/0126929 A1 | * | 6/2007 | Han et al. | 348/515 |

\* cited by examiner

*Primary Examiner*—Andrew C. Lee
(74) *Attorney, Agent, or Firm*—Thomas, Kayden, Horstemeyer & Risley

(57) ABSTRACT

A system for performing signal synchronization of data streams having frames associated with source time reference. A system clock generates a local time reference. A decoder processes the data stream. A system controller determines a difference between the source time reference and the local time reference, compares the difference against a first threshold, selects a target frame from the data stream according to content thereof, and directs the decoder to process the target frame or a frame adjacent thereto.

29 Claims, 4 Drawing Sheets

SYSTEM AND METHOD FOR PERFORMING SIGNAL SYNCHRONIZATION OF DATA STREAMS

BACKGROUND

The invention relates to signal synchronization, and more particularly to a system and method for performing signal synchronization of data streams.

In a conventional digital communication system, associated signal components are typically time-multiplexed over a single channel. Such multiplexing is common among audio/video transmission systems implemented for cable, fiber, terrestrial and satellite applications. This time-multiplexing of signal components disturbs innate time relationships between the transmission and presentation of the information. Time critical components of the transmitted component signals may be associated with a time reference before being multiplexed. This is referred to as "stamping" the information, with a time reference being referred to as a time stamp.

In order to ensure that the output of real time data matches that of the input to the receiving apparatus, the receiving apparatus should be coupled to the time base of the transmitter. When the receiving apparatus presents the data too rapidly, buffers thereof may be underflow, resulting in an interruption of output signals. Since the time clocks of the receiving and transmitting apparatus are independent, the signals transmitted from the encoder may be either slightly faster or slower than the signal processed by the receiving apparatus. When the receiving apparatus presents the data too slowly, the buffers may overflow, resulting in a loss of data.

A conventional technique to re-synchronize the decoding and presentation of data units is to skip a data unit ("frame") if the decoder is running behind, and to repeat a frame if the decoder is running ahead. However, this technique can create significantly noticeable distortion in the form of discontinuities in video and audio presentation. In the audio data bitstream, for example, an MEPG Audio Layer II frame consists of 1,152 audio samples, and can include as much as 13,824 bits of data at a sampling rate of 32 KHz and for a bit rate of 384 kbits/sec. Repeating or skipping an entire frame of audio data creates a discontinuity of approximately 0.036 seconds, which typically is audible.

Another conventional technique to re-synchronize the decoding and presentation of data units is to skip part of a data unit ("subframe") if the decoder is running behind, and to repeat a subframe if the decoder is running ahead. However, a buffer memory which is required to store several subframes of data to be skipped or repeated typically is relatively large. This typically adds to the size, complexity and/or cost of the decoder. Moreover, this technique typically requires complicated calculation, and thus a large amount of system computational resources.

SUMMARY

Systems and methods for performing signal synchronization of data streams are provided, where a data stream contains frames associated with source time reference. An exemplary embodiment of a system for performing signal synchronization of data streams comprises a system clock, a decoder, and a system controller. The system clock generates a local time reference. The decoder processes the data stream. The system controller determines a difference between the source time reference and the local time reference, compares the difference against a first threshold, selects a target frame from the data stream according to content thereof, and directs the decoder to perform a synchronization operation on the target frame or a frame adjacent thereto.

Also disclosed is an exemplary embodiment of a method for performing signal synchronization of data streams. A data stream having frames associated with source time reference is received. A local time reference is provided according to a local system clock. A difference between the source and local time references is determined, and compared against a preset threshold. A target frame is selected from the data stream according to content thereof when the difference exceeds the threshold. A synchronization operation is performed at a frame period determined according to the target frame.

Also disclosed is another embodiment of a method for performing signal synchronization of data streams. A data stream having a plurality of frames is received and stored in an input buffer. The amount of data stream stored in the input buffer is detected. The detected amount is compared against a preset range. A target frame is selected from the data stream according to content thereof when the detected amount is out of the preset range. A synchronization operation is then performed at a frame period determined according to the target frame.

DESCRIPTION OF THE DRAWINGS

Embodiments of the invention can be more fully understood by reading the subsequent detailed description and examples with references made to the accompanying drawings, wherein.

DETAILED DESCRIPTION

Systems and methods for performing signal synchronization of data streams will now be described with reference to FIGS. 1 through 4, which generally relate to signal synchronization in a receiver. While some embodiments operate with the MPEG standard, it is understood that the signal protocol used by the encoding/decoding system is not critical, and other decoding system processing a data stream carrying a time reference corresponding to a system clock of an encoding system may be readily substituted.

In the following detailed description, reference is made to the accompanying drawings which form a part hereof, and in which is shown by way of illustration of specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is only defined by the appended claims. The leading digit(s) of reference numbers appearing in the Figures corresponds to the Figure number, with the exception that the same reference number is used throughout to refer to an identical component which appears in multiple Figures.

Figure 1:
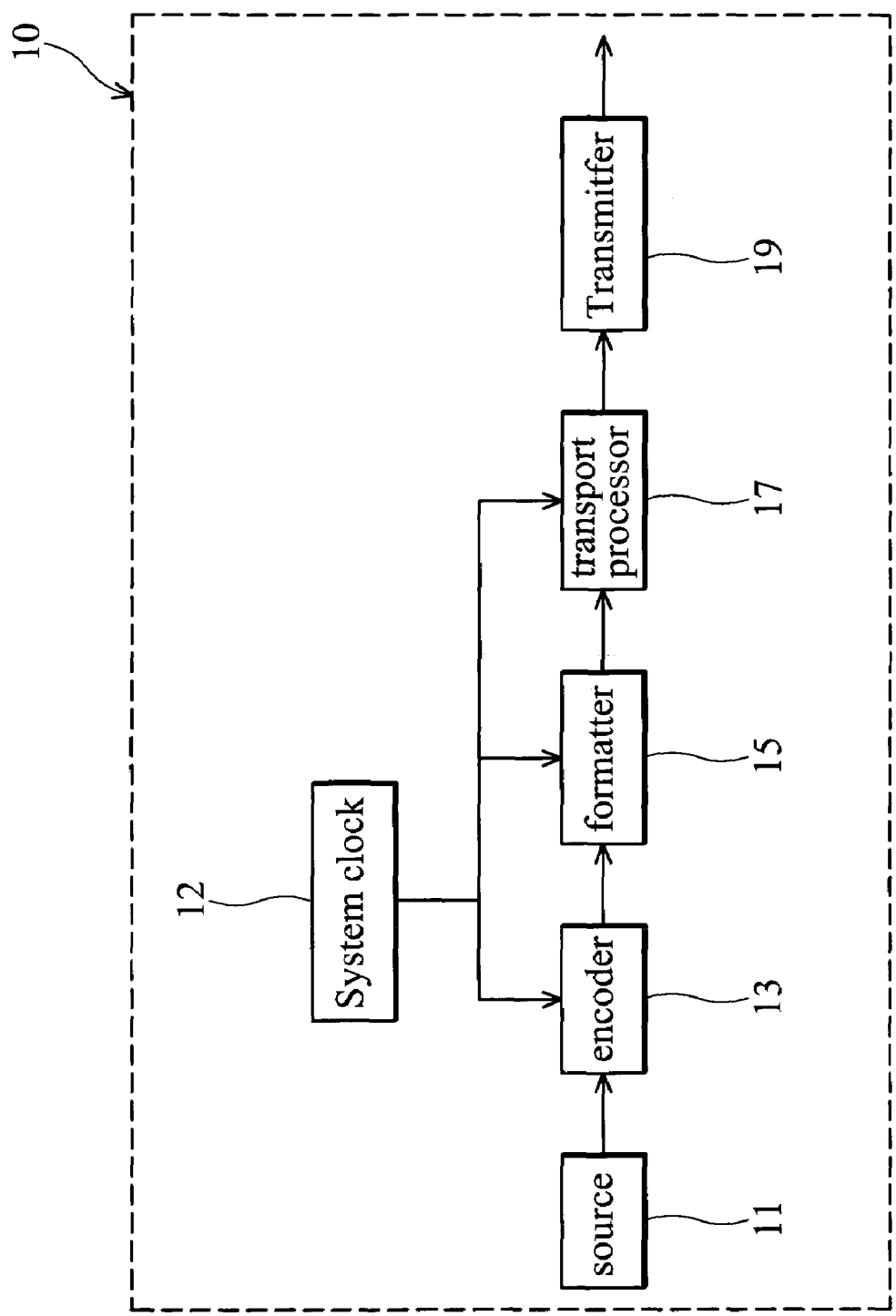
FIG. 1 is a schematic view showing an embodiment of a system for transmitting data streams.

FIG. 1 is a schematic view showing an embodiment of a system for transmitting data streams. System 10 is a system compressing and transmitting digital signals. In this system, signals from a source 11 are applied to a signal encoder 13. Signals compressed by the encoder 13 are relayed to a formatter 15. The formatter 15 arranges the encoded signals and other ancillary data according to a signal protocol, such as MPEG, a standard developed by the International Organization for Standardization. The standardized signals are then applied to a transport processor 17, which divides the signal into packets of data. The packets, normally occurring at a non-uniform rate, are applied to a rate buffer (not shown) providing output data at a relatively constant rate for transmission in a channel with relatively narrow bandwidth. The buffered data is coupled to a transmitter 19 performing signal transmission. A system clock 12 provides clocking signals to operate much of system 10, such as the encoder 13. System clock 12, used to generate timing information, operates at a fixed frequency, such as 27 MHz for example. The timing information is included in the compressed signal as ancillary data denoting a system time reference by the formatter 15, and is used for an apparatus receiving the signals for synchronization.

Figure 2:
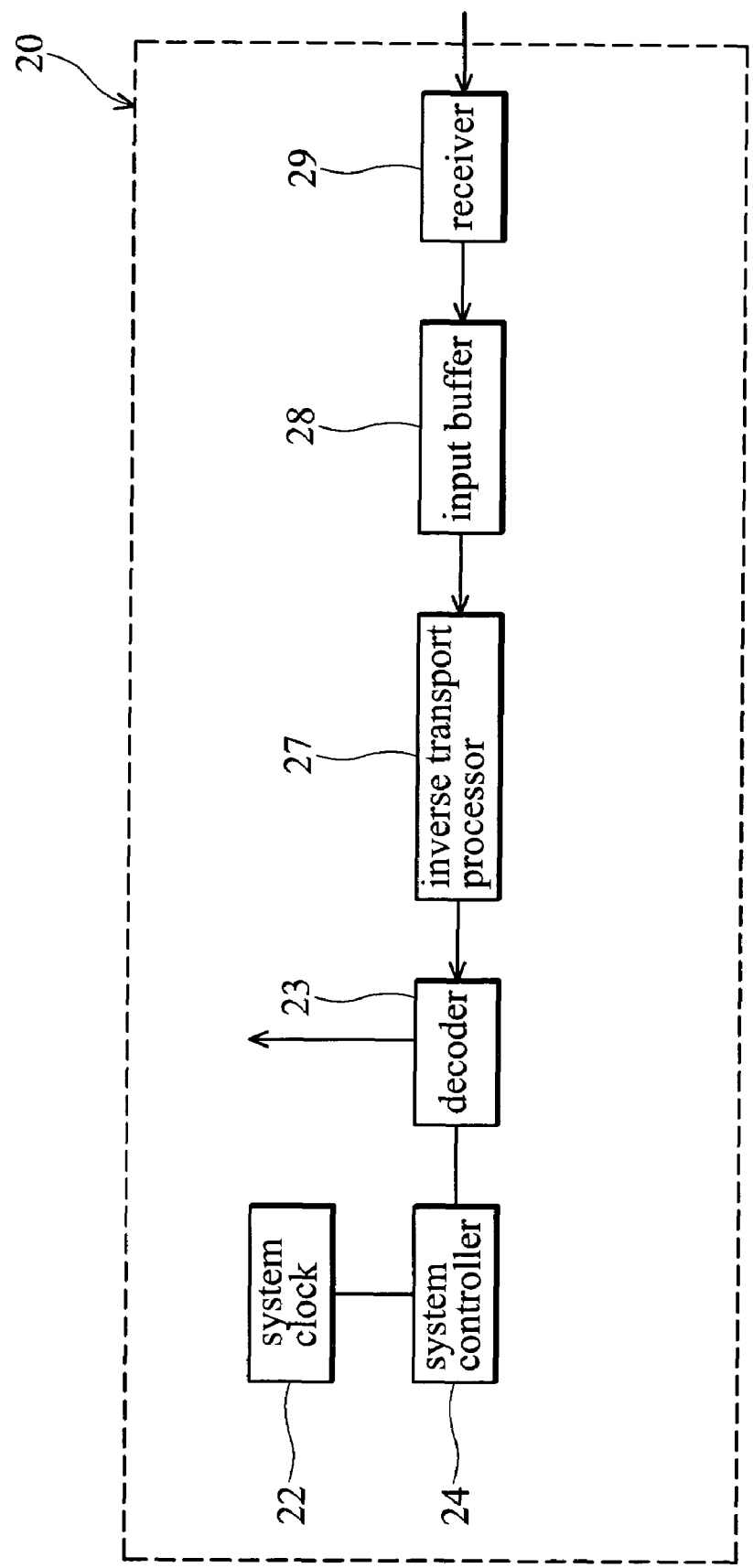
FIG. 2 is a schematic view of an embodiment of a system for receiving data streams.

FIG. 2 is an embodiment of a system for receiving data streams. System 20 is an exemplary system receiving and decoding digital signals. In this system, signals are received by receiver 29 from a signal transmitter, wherein the receiver 29 performs the inverse function of the transmitter 19. The received signals are stored in input buffer 28 before further processing. The received signals are then relayed to an inverse transport processor 27 dividing respective transport packets by service and allocating the respective data to appropriate processing channels. In so doing, the respective packet payloads are separated from the ancillary data, with the respective payloads being applied to the appropriate processing channel and the ancillary data applied to a system controller 24. Encoded signals from the inverse transport processor 27 are applied to a rate buffer (not shown), providing encoded signals according to the system protocol to a decoder 23. The rate buffer accepts data at a non-constant rate, and provides data to the decoder 23. The decoder 23, responsive to the encoded signal, generates decoded signals for an appropriate device (not shown) The inverse transport processor 27 also provides timing information to system controller 24 according to the ancillary data, wherein the timing information denotes a system time reference associated with the signal transmitter. The system controller 24 retrieves local time information from a local system clock 22, and uses the local system time reference and the system time reference specified in the received packet (herein after referred to as a source time reference) to direct a synchronization operation. The system controller 24 determines a difference between source and local time references, compares the difference against a first threshold, selects a target frame according to preset criteria when the difference exceeds the first threshold, and directs decoder 23 to perform the synchronization operation. The decoder 23 performs the synchronization operation by skipping/inserting/repeating at least one frame at an appropriate time according to the target frame.

Figure 3:
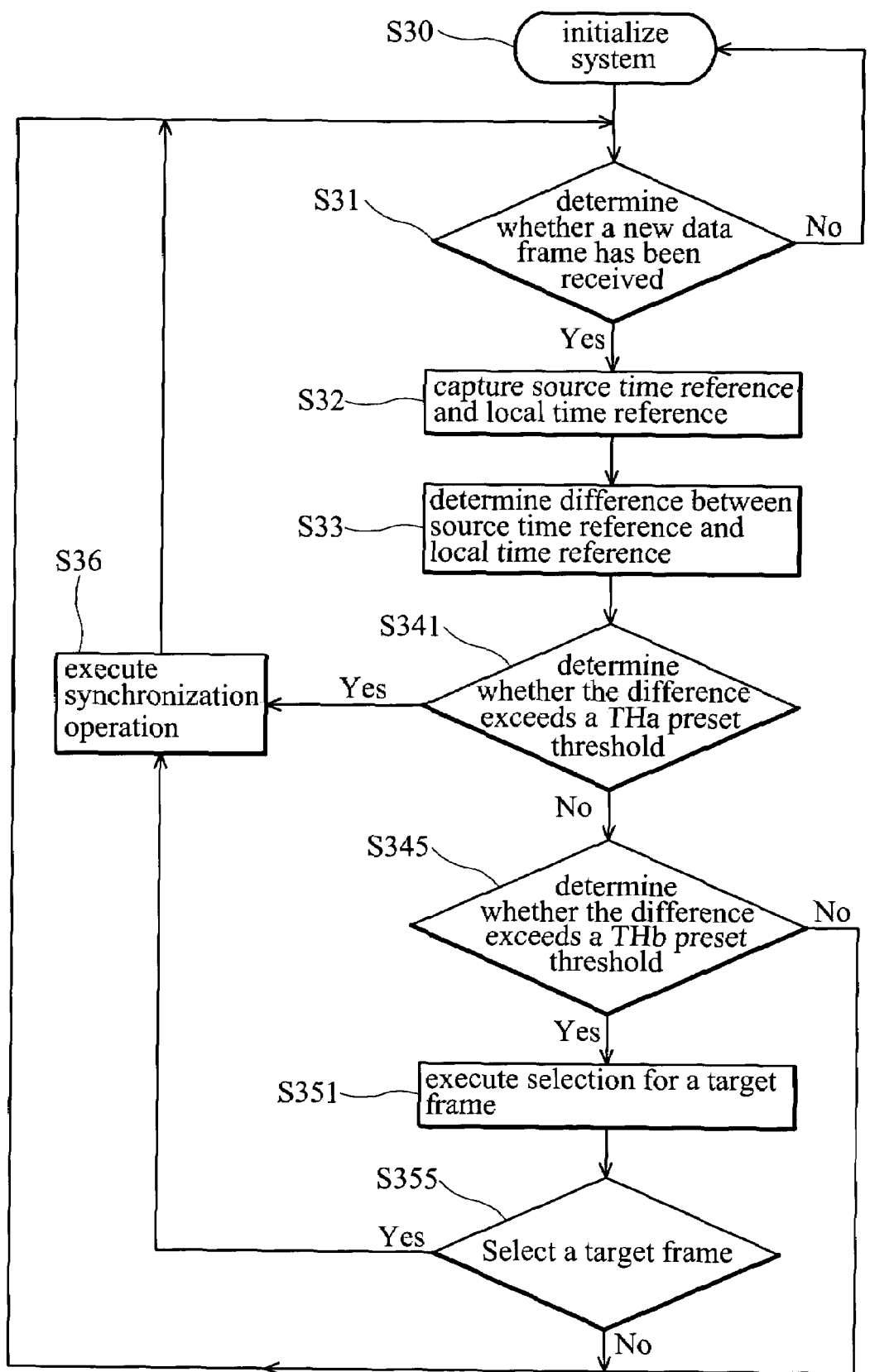
FIG. 3 is a flowchart of an embodiment of a synchronization method.

The processing algorithm implemented in system 20 is detailed in the flowchart of FIG. 3. The system 20 is first initialized (step S30). It is then determined whether a new data frame has been received (step S31). If a new data frame has been received, the timing information (source time reference) carried by the new data frame is then captured (step S32). On the arriving of the new data frame, timing information (local time reference) generated by the system clock 22 is also captured (step S32). The source time reference and local time reference are then compared, and a difference therebetween is determined accordingly (step S33). It is then determined whether the difference exceeds a preset threshold $TH_a$ (step S341), and if so, the method proceeds to step S36 directly, otherwise the method proceeds to step S345. For example, the preset threshold $TH_a$ may be set as two frame periods. In cases where the time difference between the source and time references is kept within two frame period, the asynchronous typically is imperceptible. The preset time period may specify an upper limit and lower limit for the difference between the source and local time references.

It is then determined whether the difference exceeds a preset threshold $TH_b$ (step S345), and if so, selection for a target frame is executed according to preset criteria (step S351). If the difference is not over this threshold, the method returns to step S31. The preset threshold $TH_b$ may be set as one frame period. In other words, when the difference exceeds one frame period, a synchronization operation is to be performed; otherwise, the data stream is regarded as synchronous, and no synchronization operation need to be performed. The preset threshold may specify different values for positive and negative differences, respectively. For example, an upper limit for a positive difference may be set as one frame period; while a lower limit for a negative difference may be set as two frame periods. The preset threshold may be determined experimentally or by other methods. In step S355, it is determined whether a target frame has been selected. When a target frame is selected, a synchronization operation is executed (step S36). If a target frame cannot be found after a preset time, the method returns to step S31

The criteria of selecting a target frame are designed to meet special needs, and differ for different types of data frames. For example, for video data frames, the criteria can specify a motion vector threshold; for audio data frames, an audio volume threshold can be specified.

Several mechanisms, such as skipping, inserting, and repeating, can be used in the synchronization operation. When the source time reference ahead of the local time reference exceeds a preset threshold, the skipping mechanism is adopted. Skipping at least one frame or fixed intervals of data advances the decoding data stream by a fixed interval relative to the source data stream.

When the source time reference falls behind the local time reference beyond a preset threshold, the inserting and/or repeating mechanism are employed.

In some embodiments, skipping and inserting can be executed in the frame period following the selected target frame, thus the distortion caused by skipping and inserting is reduced. When the source time reference surpasses the local time reference, the target frame may be discarded instead. Additionally, when the local time reference surpasses the source time reference, the target frame may be repeated. For audio data frames, a data frame having audio volume lower than a preset criterion can be skipped or inserted. For example, the target frame is selected according to audio volume, frame energy, and/or frame entropy thereof. Some embodiments select a data frame with volume lower than −60 dB as the target frame. A predefined pattern, the target frame, or a blank data frame may be inserted in a frame period determined according to the target frame. For video data frame, a data frame having a motion vector smaller than a preset criterion can be skipped or inserted.

Figure 4:
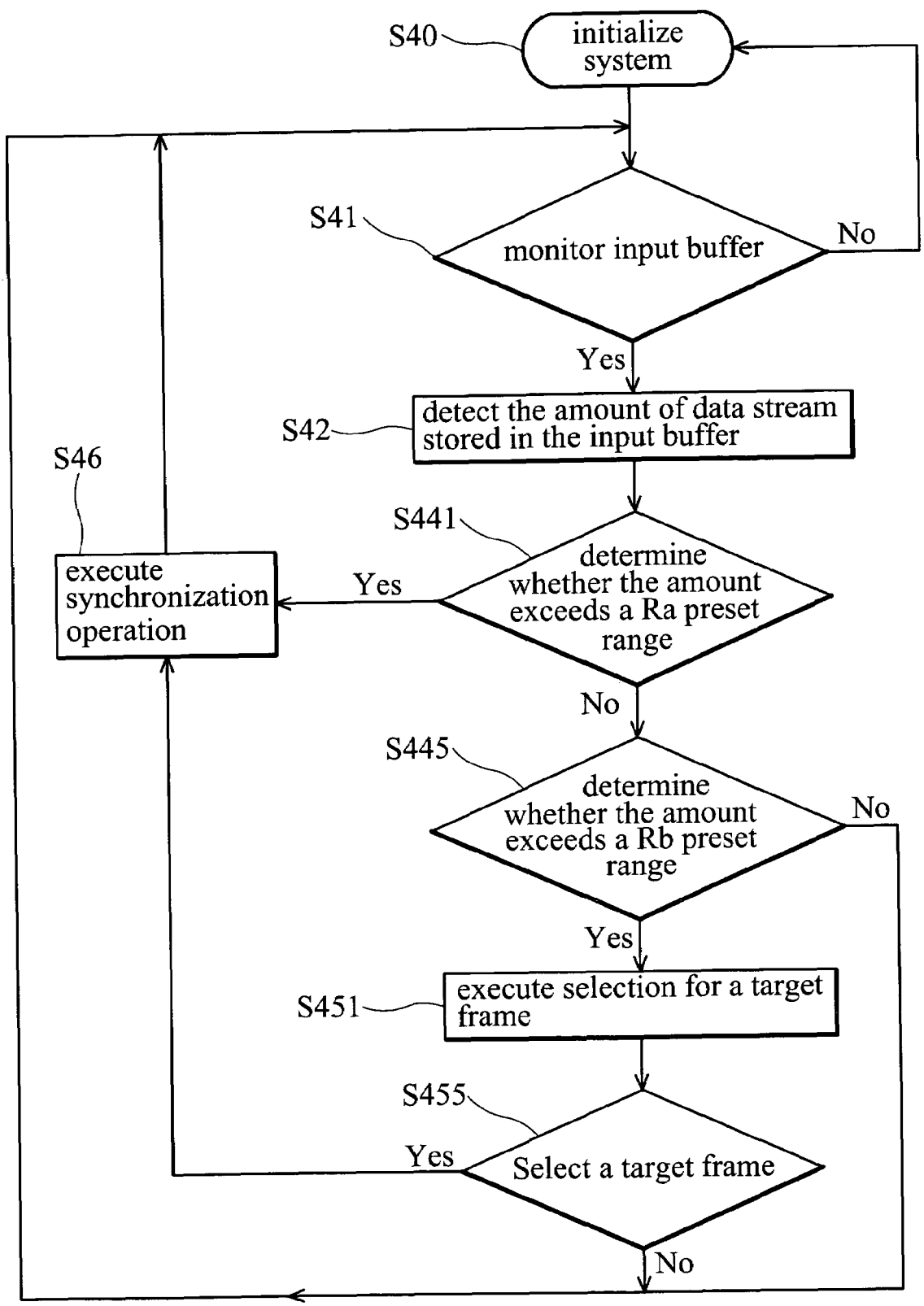
FIG. 4 is a flowchart of another embodiment of a synchronization method.

Another processing algorithm implemented in system 20 is detailed in the flowchart of FIG. 4. The system 20 is first initialized (step S40). Next, input buffer 28 receiving and storing data frames is monitored (step S41). The amount of data stream stored in the input buffer is then detected (step S42). The amount of data stored in the input buffer is compared against a preset range. It is then determined whether the detected amount is out of a preset range $R_a$ (step S441), and if so, the method proceeds to step S46, otherwise the method proceeds to step S445. The preset range may specify an upper limit and lower limit for the data amount stored in the input buffer.

It is further determined whether the detected amount is out of a preset range $R_b$ (step S445), and if so, selection for a target frame is executed according to preset criteria (step S451). If the detected amount is within the preset range $R_b$, the method returns to step S41. The preset range $R_b$ may be smaller than the preset range $R_a$. In other words, when the amount of data in the input buffer is out of the preset range $R_a$, a synchronization operation is required immediately without selecting a target frame as a position to perform the synchronization operation. When the amount of data in the input buffer is within the preset range $R_a$ but is out of the preset range $R_b$, a synchronization operation is performed at a selected frame period. When the amount of data in the input buffer is within the preset range $R_b$, the data stream is regarded as synchronous, and no synchronization operation needs to be performed. In step S455, it is determined whether a target frame has been selected. When a target frame is selected, a synchronization operation is executed (step S46). If a target frame cannot be found after a preset time, the method returns to step S41

The preset criteria for selecting a target frame are designed to meet special needs, and differ for different types of data frames. For example, for video data frames, the criteria can specify a motion vector threshold; for audio data frames, an audio volume threshold can be specified.

Several mechanisms, such as skipping, discarding, inserting, and repeating, can be used in the synchronization operation. When the amount of data exceeds an upper limit of the preset range, the skipping and/or discarding mechanism is adopted. Skipping and/or discarding at least one frame or fixed intervals of data advances the decoding data stream by a fixed interval relative to the source data stream.

When the amount of data is below a lower limit of the preset range, the inserting and/or repeating mechanism are employed.

In some embodiments, skipping and inserting can be executed in the frame period following the selected target frame, thus the distortion caused by skipping and inserting is reduced. When the amount of data exceeds the upper limit of the preset range, the target frame may be discarded instead. Additionally, when the amount of data is below the lower limit, the target frame may be repeated. For audio data frames, a data frame having audio volume lower than a preset criterion can be skipped or inserted. For example, the target frame is selected according to audio volume, frame energy, and/or frame entropy thereof. Some embodiments select a data frame with volume lower than −60 dB as the target frame. A predefined pattern, the target frame, or a blank data frame may be inserted in a frame period determined according to the target frame. For video data frame, a data frame having a motion vector smaller than a preset criterion can be skipped or inserted.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for performing signal synchronization of data streams having frames associated with source time reference, comprising:
   a system clock configured to generate a local time reference;
   a decoder processing the data stream; and
   a system controller configured to determine a difference between the source time reference and the local time reference, compare the difference against a first threshold, select a target frame from the data stream according to content thereof when the difference exceeds the first threshold, and direct the decoder to perform a synchronization operation on the target frame or a frame adjacent thereto.

2. The system of claim 1, wherein the system controller directs the decoder to skip at least one frame immediately following the target frame when the source time reference surpasses the local time reference in excess of the first threshold.

3. The system of claim 1, wherein the system controller directs the decoder to discard the target frame when the source time reference surpasses the local time reference in excess of the first threshold.

4. The system of claim 1, wherein the system controller directs the decoder to insert at least one frame into a frame period immediately following the target frame when the local time reference surpasses the source time reference in excess of the first threshold.

5. The system of claim 1, wherein the system controller directs the decoder to repeat the target frame when the local time reference surpasses the source time reference in excess of the first threshold.

6. The system of claim 1, wherein the system controller selects the target frame according to audio volume thereof.

7. The system of claim 1, wherein the system controller selects the target frame according to a motion vector thereof.

8. The system of claim 1, wherein the system controller further determines whether the difference exceeds a second threshold that is greater than the first threshold, and if so, triggers the synchronizing operation directly.

9. The system of claim 1, further comprising an input buffer, wherein the system controller further determines an amount of data stream stored in the input buffer, compares the amount against a preset range, and conducts selection of the target frame when the amount of stored data stream is out of the preset range.

10. The system of claim 9, wherein the system controller directs the decoder to skip at least one frame immediately following the target frame when the amount of stored data stream exceeds an upper limit of the preset range.

11. The system of claim 9, wherein the system controller directs the decoder to discard the target frame when the amount of stored data stream exceeds an upper limit of the preset range.

12. The system of claim 9, wherein the system controller directs the decoder to insert at least one frame into a frame period immediately following the target frame when the amount of stored data stream is below a lower limit of the preset range.

13. The system of claim 9, wherein the system controller directs the decoder to repeat the target frame when the amount of stored data stream is below a lower limit of the preset range.

14. A method of performing signal synchronization of data streams, comprising:

receiving a data stream having frames associated with a source time reference;

providing a local time reference according to a local system clock;

determining a difference between the source and local time references;

comparing the difference against a first threshold;

selecting a target frame from the data stream according to content thereof when the difference exceeds the first threshold; and performing a synchronization operation at a frame period determined according to the target frame.

15. The method of claim 14, further comprising skipping at least one of the frames at a frame period immediately following the target frame when the source time reference surpasses the local time reference in excess of the first threshold.

16. The method of claim 14, further comprising discarding the target frame when the source time reference surpasses the local time reference in excess of the first threshold.

17. The method of claim 14, further comprising inserting at least one of the frames into a frame period immediately following the target frame when the local time reference surpasses the source time reference in excess of the first threshold.

18. The method of claim 14, further comprising repeating the target frame when the local time reference surpasses the source time reference in excess of the first threshold.

19. The method of claim 14, wherein the target frame is selected according to audio volume thereof.

20. The method of claim 14, wherein the target frame is selected according to a motion vector thereof.

21. The method of claim 14, further comprising determining whether the difference exceeds a second threshold that is greater than the first preset threshold, and if so, performing the synchronization operation without selecting the target frame.

22. A method of performing signal synchronization of data streams, comprising:

storing a received data stream having a plurality of frames in an input buffer;

determining an amount of the data stream stored in the input buffer;

comparing the amount of stored data stream against a preset range;

selecting a target frame from the data stream according to content thereof when the amount of stored data stream is out of the preset range; and performing a synchronization operation at a frame period determined according to the target frame.

23. The method of claim 22, further comprising skipping at least one frame immediately following the target frame when the amount of stored data stream exceeds an upper limit of the preset range.

24. The method of claim 22, further comprising discarding the target frame when the amount of stored data stream exceeds an upper limit of the preset range.

25. The method of claim 22, further comprising inserting at least one frame into a frame period immediately following the target frame when the amount of stored data stream is below a lower limit of the preset range.

26. The method of claim 22, further comprising repeating the target frame when the amount is below a lower limit of the preset range.

27. The method of claim 22, wherein the target frame is selected according to audio volume thereof.

28. The method of claim 22, wherein the target frame is selected according to a motion vector thereof.

29. The method of claim 22, further comprising determining whether the amount of stored data stream is out of a second preset range that is larger than the preset range, and if so, performing the synchronization operation without selecting the target frame.

* * * * *